United States Patent [19]

Byers et al.

[11] Patent Number: 5,142,629
[45] Date of Patent: Aug. 25, 1992

[54] SYSTEM FOR INTERCONNECTING MSUS TO A COMPUTER SYSTEM

[75] Inventors: Larry L. Byers, Apple Valley; Joseba M. Desubijana, Minneapolis, both of Minn.

[73] Assignee: Unisys Corporation, Blue Bell, Pa.

[21] Appl. No.: 403,640

[22] Filed: Sep. 6, 1989

[51] Int. Cl.⁵ ............................................. G06F 13/14
[52] U.S. Cl. ................................... 395/325; 395/200; 395/275; 364/DIG. 1; 364/238.4; 364/245; 364/245.7
[58] Field of Search ... 364/200 MS File, 900 MS File, 364/DIG. 1, DIG. 2; 395/200, 275, 325, 425

[56] References Cited

U.S. PATENT DOCUMENTS

| | | | |
|---|---|---|---|
| 4,644,496 | 2/1987 | Andrews | 395/800 |
| 4,739,476 | 4/1988 | Fiduccia | 395/800 |
| 4,805,091 | 2/1989 | Thiel et al. | 395/800 |
| 4,875,207 | 10/1989 | Van Twist et al. | 370/85.12 |

Primary Examiner—Gareth D. Shaw
Assistant Examiner—John C. Loomis
Attorney, Agent, or Firm—John B Sowell; Glenn W. Bowen; Mark T. Starr

[57] ABSTRACT

An improved system for interconnecting main storage units is provided wherein each main storage unit is provided with a support control card and each support control card is provided with interface connection means comprising $X-1$ number of interfaces where $X$ is a value equal to the number of MSUs. And means for enabling the connection of the interfaces between different pairs of MSUs to operably connect any number of said $X$ number of MSUs to a plurality of data processors employing $X(X-1)/2$ pairs of cables.

10 Claims, 8 Drawing Sheets

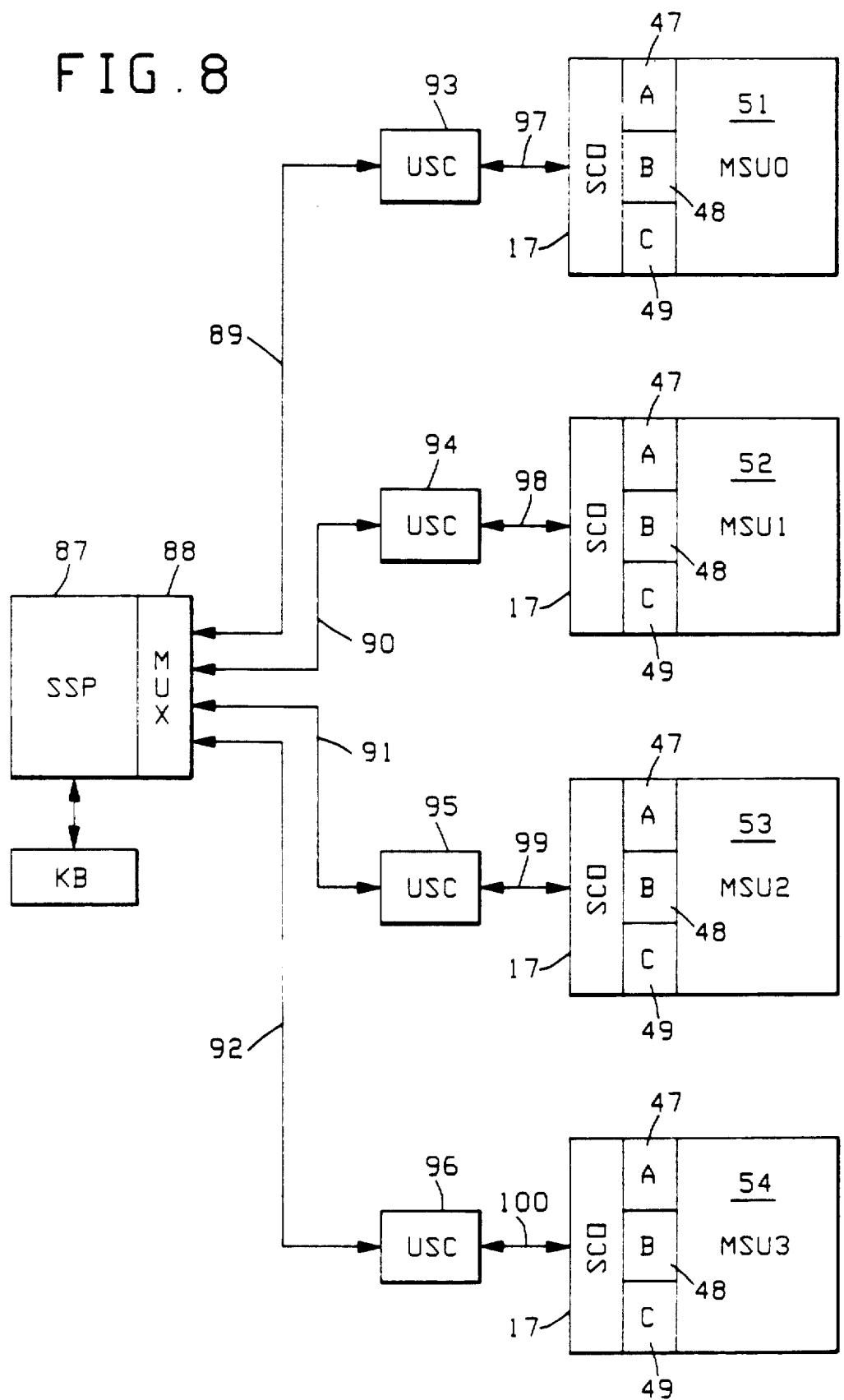

SYSTEM FOR INTERCONNECTING MSUS TO A COMPUTER SYSTEM

BACKGROUND OF THE INVENTION

1. Field of the Invention

The present invention relates to multi-processor apparatus which includes a plurality of processors operably connected to access a plurality of main storage units (MSUs). More particularly, the present invention relates to an improved system for operably interconnecting input-output cables to properly connect a plurality of MSUs for operation by a plurality of data processors.

2. Description of the Prior Art

Heretofore, large mainframe computing systems have been manufactured and sold which included a plurality of instruction processors and a plurality of I/O processors adapted to be programmably connected to a plurality of MSUs. Such configurations of computing systems are commonly referred to as multi-processor computing systems wherein any particular instruction processor and its associated I/O processor(s) may be connected to a plurality of MSUs. The interconnections between MSUs can only be connected or configured after knowing the number of instruction processors in the multi-processor system and further knowing which of the MSUs will be accessed by the different ones of the instruction processors.

It is well known in the prior art that being able to custom configure a multi-processor system enhances the throughput and increases the efficiency of multi-processor systems. Heretofore, MSUs have been provided with a plurality of interfaces, each of which may be operably connected to another MSU in a multi-MSU configuration by programmably opening and closing latches or switches which operatively connect the input-output cables at the interface of the MSU.

It is a feature of the present invention to provide a more efficient and less costly interface and interconnection structure at the MSUs.

SUMMARY OF THE INVENTION

It is a principal object of the present invention to eliminate one of the interface or interface connections previously required on multiple MSUs adapted to be connected with other MSUs in a multi-processor computer configuration.

It is another object of the present invention to provide a programmable interconnection of input-output cables between four MSUs, each having only three interfaces.

It is another object of the present invention to reduce the number of interfaces previously required to interconnect a plurality of MSUs to a plurality of data processors.

It is another object of the present invention to simplify the hardware and the software required to interconnect input-output cables of MSUs.

It is another object of the present invention to reduce the cost of manufacture of identical MSUs used in a multi-processor configuration.

It is another object of the present invention to increase the reliability of a multi-processor computer system.

According to these and other objects of the present invention, four main storage units (MSUs) are provided for interconnection in a multi-processor system and each MSU is provided with only three interfaces. Six pairs of input-output cables are physically connected between the interfaces of each MSU and the MSUs are programmably operable to actively interconnect the input-output cables with predetermined MSUs to provide a desired and variable multi-processor system.

BRIEF DESCRIPTION OF THE DRAWINGS

FIG. 8 is a schematic block diagram showing a system support processor (SSP) of the type employed to programmably configure the system and to initiate the operable interconnection of the input-output cables between interfaces of MSUs.

DESCRIPTION OF THE PREFERRED EMBODIMENT

Figure 1:
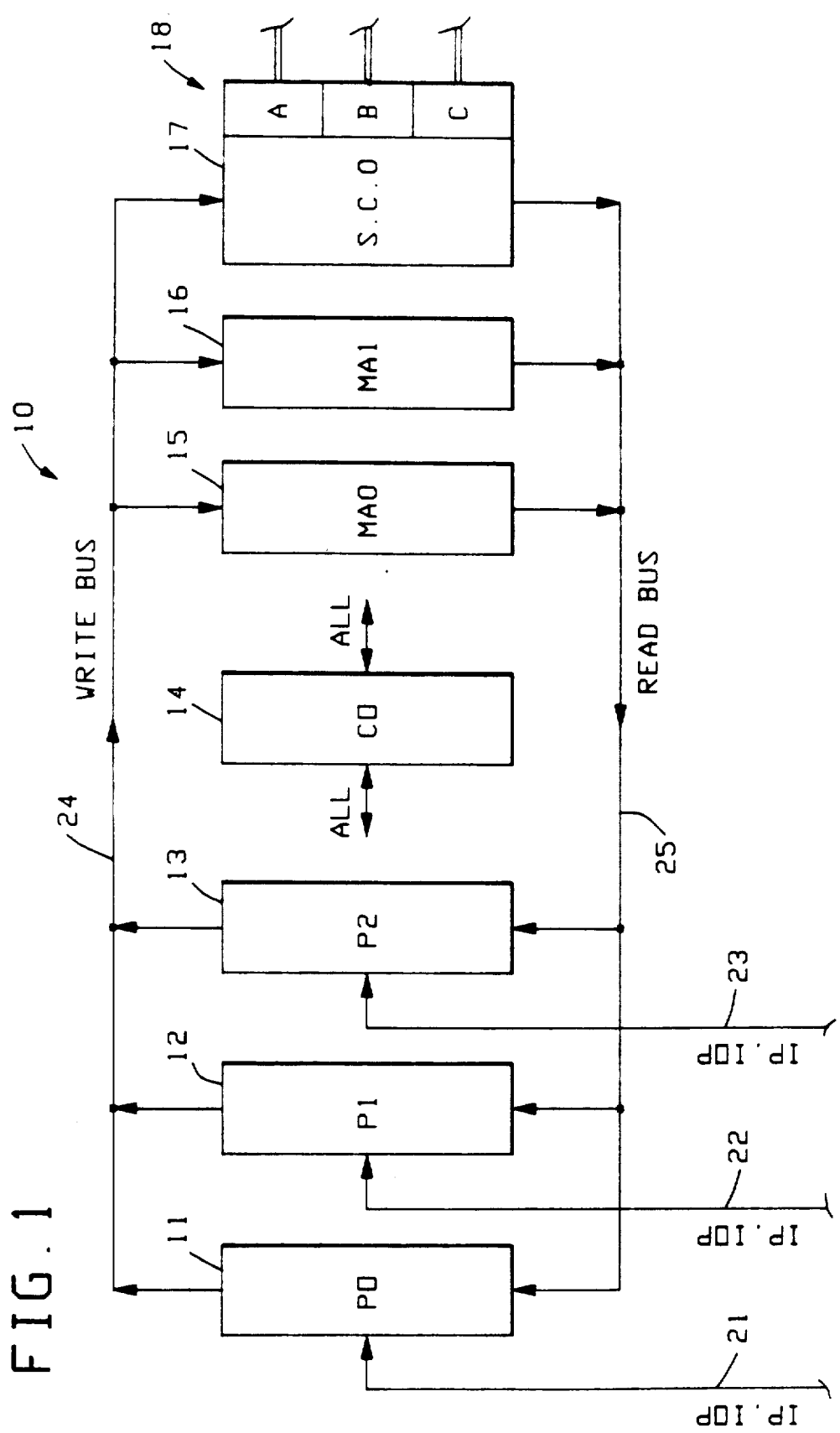
FIG. 1 is a schematic block diagram of a single preferred embodiment MSU shown connected to three data processors.

Refer now to FIG. 1 showing a schematic block diagram of a single preferred embodiment MSU 10 which comprises seven cards containing the active components of a main storage unit. Three port cards P0, P1 and P2 are numbered 11, 12 and 13, respectively. Control card CO is numbered 14 and is connected by control lines to all of the other cards in the MSU. Memory array cards MAO and MA1 are numbered 15 and 16 contain the active memory for the computer systems. Support control card 17 performs the initial program loading, and provides the day clock for the complete MSU and contains status registers and other components required for initiating operation of the system. Three interfaces 18 are shown at the edge of support control 17 and will be explained in more detail hereinafter. Instruction processors and input-output (I/O) processors are connected to the MSU through busses 21, 22 and 23 and are operably connected to the memory arrays MAS and support control card SC via a read bus 25 and a write bus 24.

Figure 2:
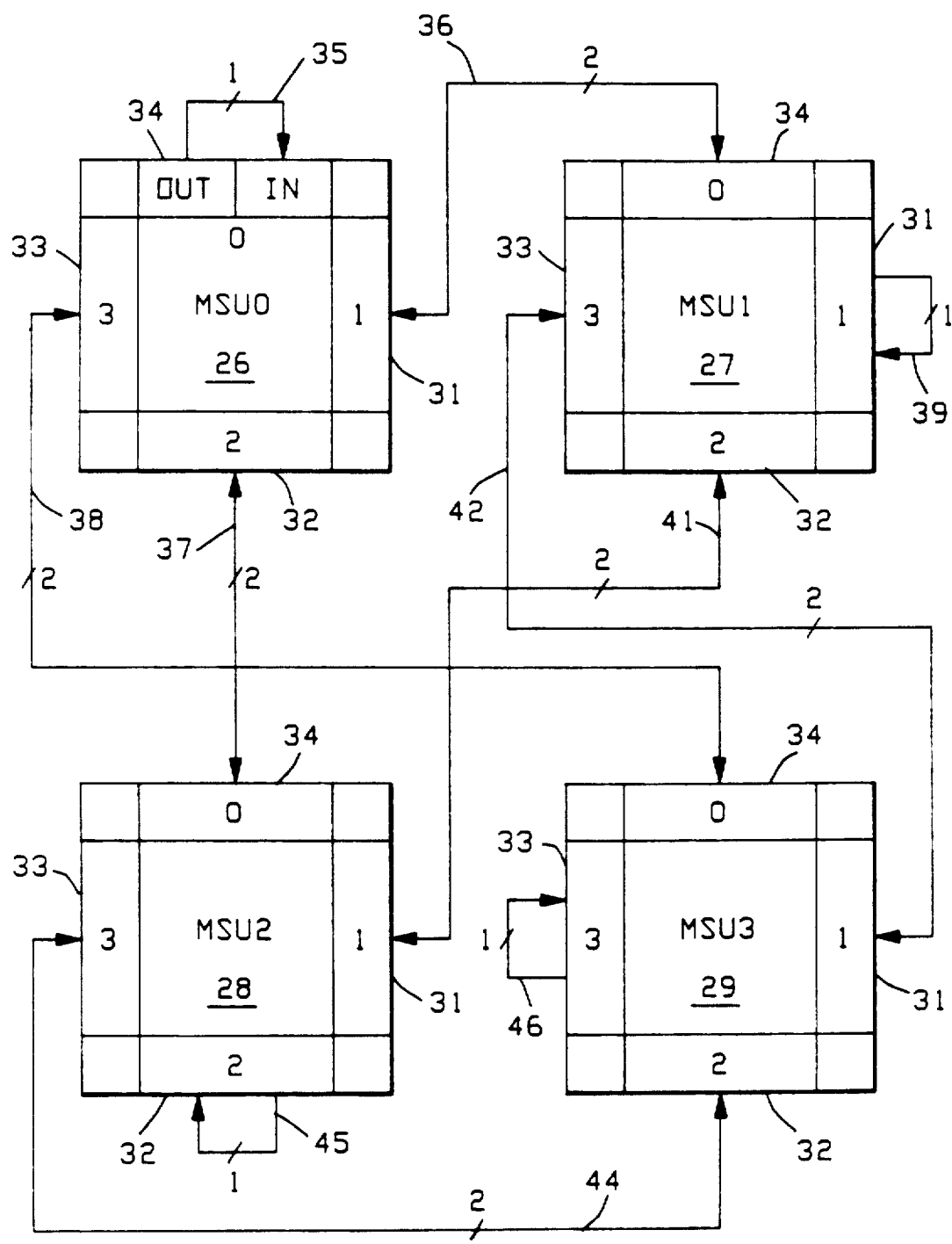
FIG. 2 is a schematic block diagram showing four prior art MSUs, each having four input-output interfaces which are interconnected by sixteen input-output cables.

Refer now to FIG. 2 showing a schematic block diagram of four MSUs, like MSU 10, which are interconnected by input-output cables. The prior art MSUs 26-29 are shown having four interfaces, each of which is electrically connected to its MSU in a different manner but having the same type pin connection for the number of lines or leads required. Each of the different numbered interfaces 31-34 are identical on the four MSUs and is numbered the same. Each of the interfaces 31-32 comprises an input and an output portion, which are usually adapted to be interconnected by a multi-line cable. In the prior art, the four interfaces on each of the MSUs 26-29 were connected in the manner shown wherein cable 35 forms a shunt cable at MSU O from the input to its own output interface. Interface 31 of MSU O is shown connected by a pair of cables to interface 34 (the O interface) of MSU 1. Interface 32 of MSU O is connected by a pair of cables 37 to the O interface of MSU 28. Similarly, interface 33 of MSU 26 is connected by a pair of cables to the O interface of MSU 29. MSU 1 is shown having its interface 1 or interface 31 connected by a turnaround or shunt cable 39. A pair of cables 41 interconnects interface 32 of MSU 27 with interface 31 of MSU 28. A pair of cables 42 interconnects interface 33 of MSU 27 with interface 31 of MSU 29.

In a similar manner, the interfaces 32 and 33 of MSU 28 are connected to other interfaces by cables 44 and 45, in the manner shown. Leaving only the shunt cable 46 of MSU 29 to be connected from the input to the output of its own interface 33.

The FIG. 2 prior art method of interconnecting four MSUs requires sixteen individual cables to interconnect the four input-output interfaces, four of which are provided on each MSU. It will be understood that each interface comprises an input and and output portion as explained hereinbefore. As will be explained hereinafter, the operable connections of the interfaces to the individual MSUs were programmable so that the cables shown were fixed by the manufacturer when the system was placed in operation and were not changed unless the number of MSUs was changed.

Figure 3:
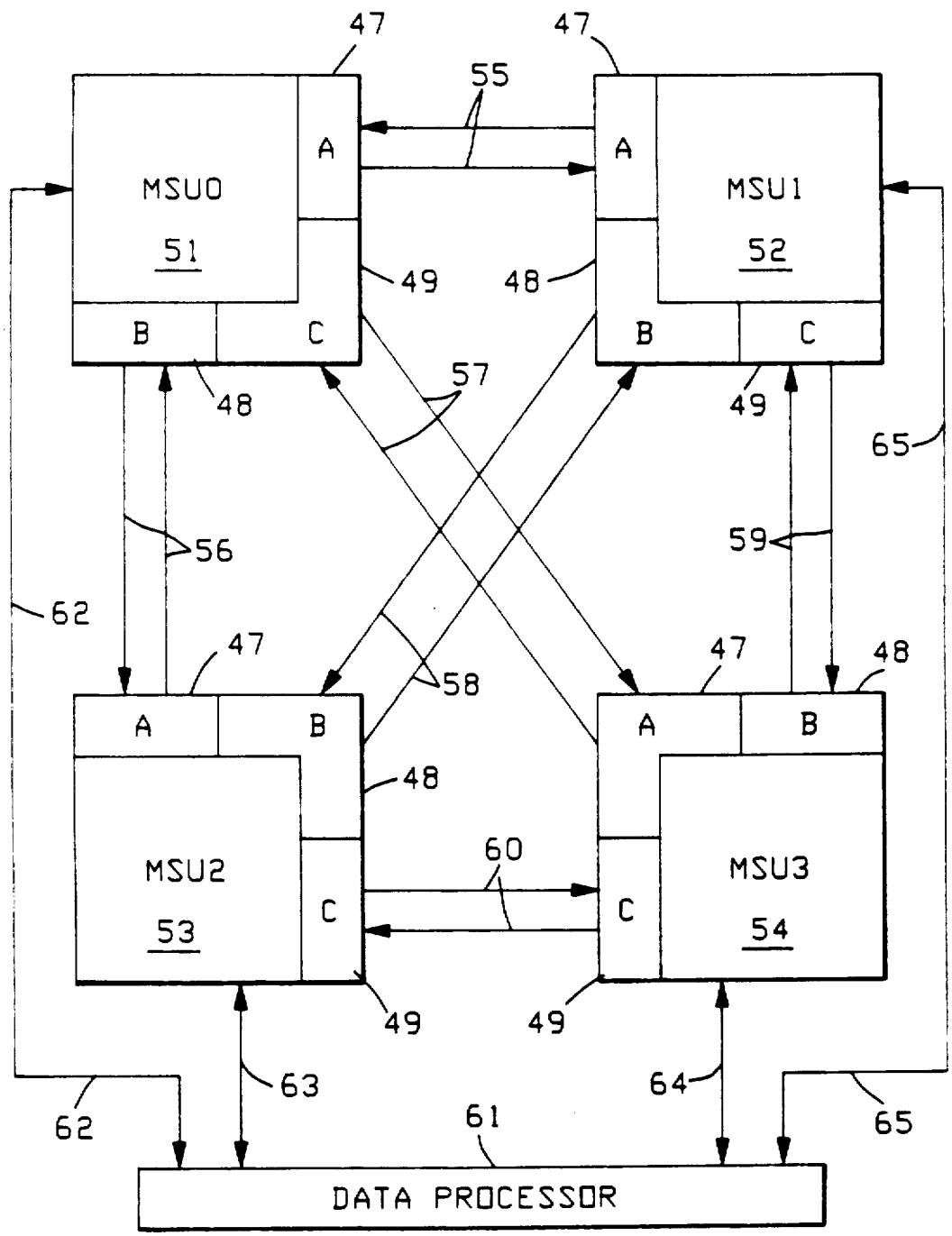
FIG. 3 is a schematic block diagram showing the present invention four MSUs, each having three input-output interfaces interconnected by twelve input-output cables and each MSU is connected operably to the same data processor.

Refer now to FIG. 3 showing a schematic block diagram of four present invention MSUs, each having only three input-output interfaces A, B and C numbered 47-49, respectively. MSUs 51-54, as explained hereinbefore, the pairs of cables for the interfaces 47-49 or interfaces A-C comprise an input and an output portion which are identical and are interconnected in the preferred embodiment by pairs of cables 55-60. It will be noted that only six pairs of individual cables comprising twelve individual cables and no shunt or turnaround cables are required in the present configuration which substantially reduces the number of variables required for hardware and software implementation.

For purposes of explanation, a data processor 61 is shown connected by cables numbered 62-65 to the MSUs 51-54. It will be explained that no such point-to-point cables 62-65 exists in the system. The connection from a data processor was shown in FIG. 1 being made via IP, IOP busses; via port cards 11-13 and read-write busses 24-25. The connections and programming for properly routing the IP and IOP busses to the respective MSUs is known in the prior art and does not require explanation herein.

Figure 4:
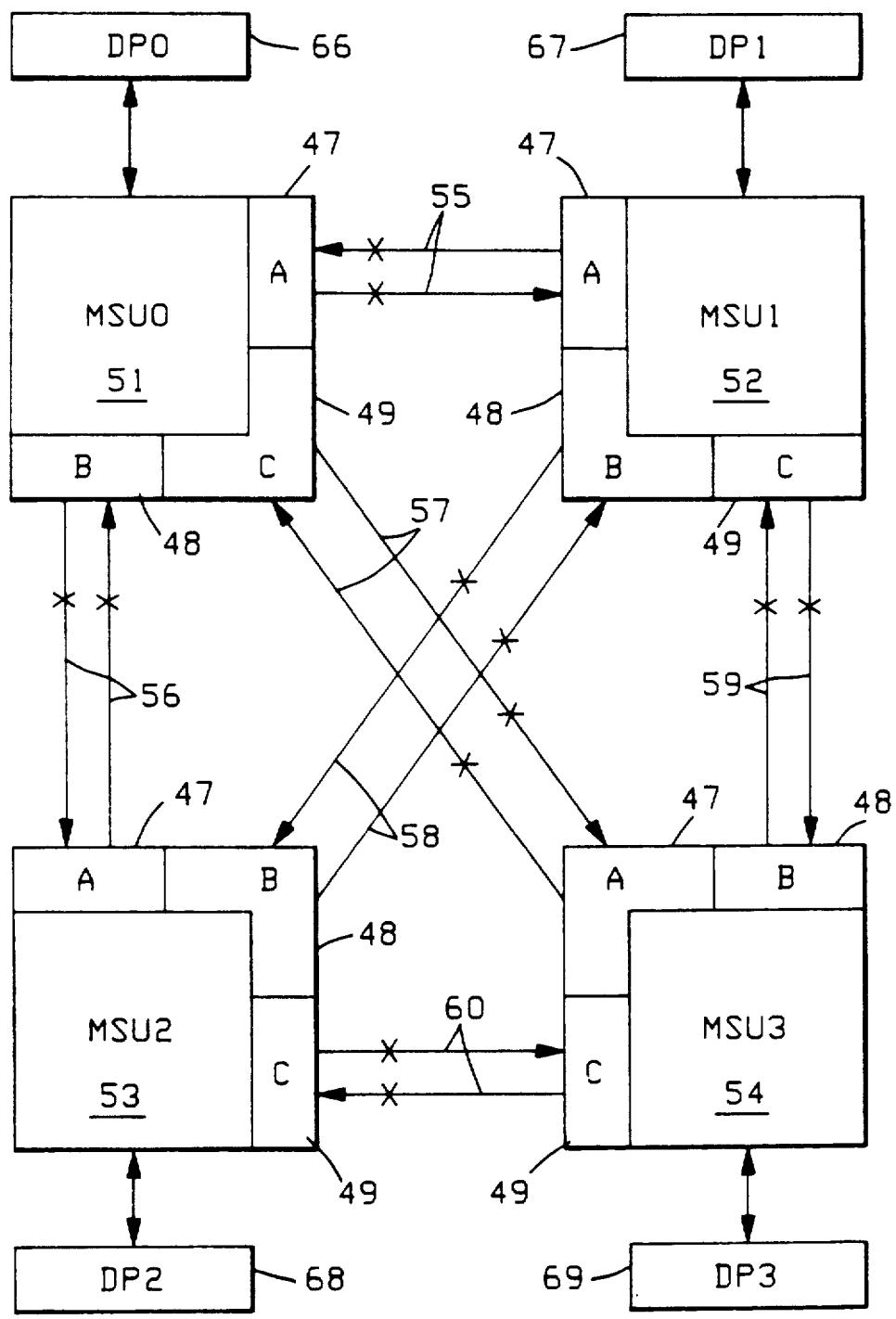
FIG. 4 is a schematic block diagram showing the four MSUs of FIG. 3 connected operably to four individual data processors.

Refer now to FIG. 4 showing a block diagram of the same four MSUs having the same six pairs of interconnecting cables and interfaces which are numbered the same as in FIG. 3. The four data processors 66-69 are connected to individual MSUs 51-54 in four one-by-one combinations. That is to say that one data processor 66 is connected to one MSU 51 and the same configuration is repeated for all four MSUs and data processors to provide four one-by-one configurations. In order to effectively connect the MSUs, or in this case to effectively disconnect the MSUs from each other, the pairs of cables 55-59 are shown with an X across each of the twelve individual cables indicating that they are disconnected from their respective interfaces 47-49.

Figure 5:
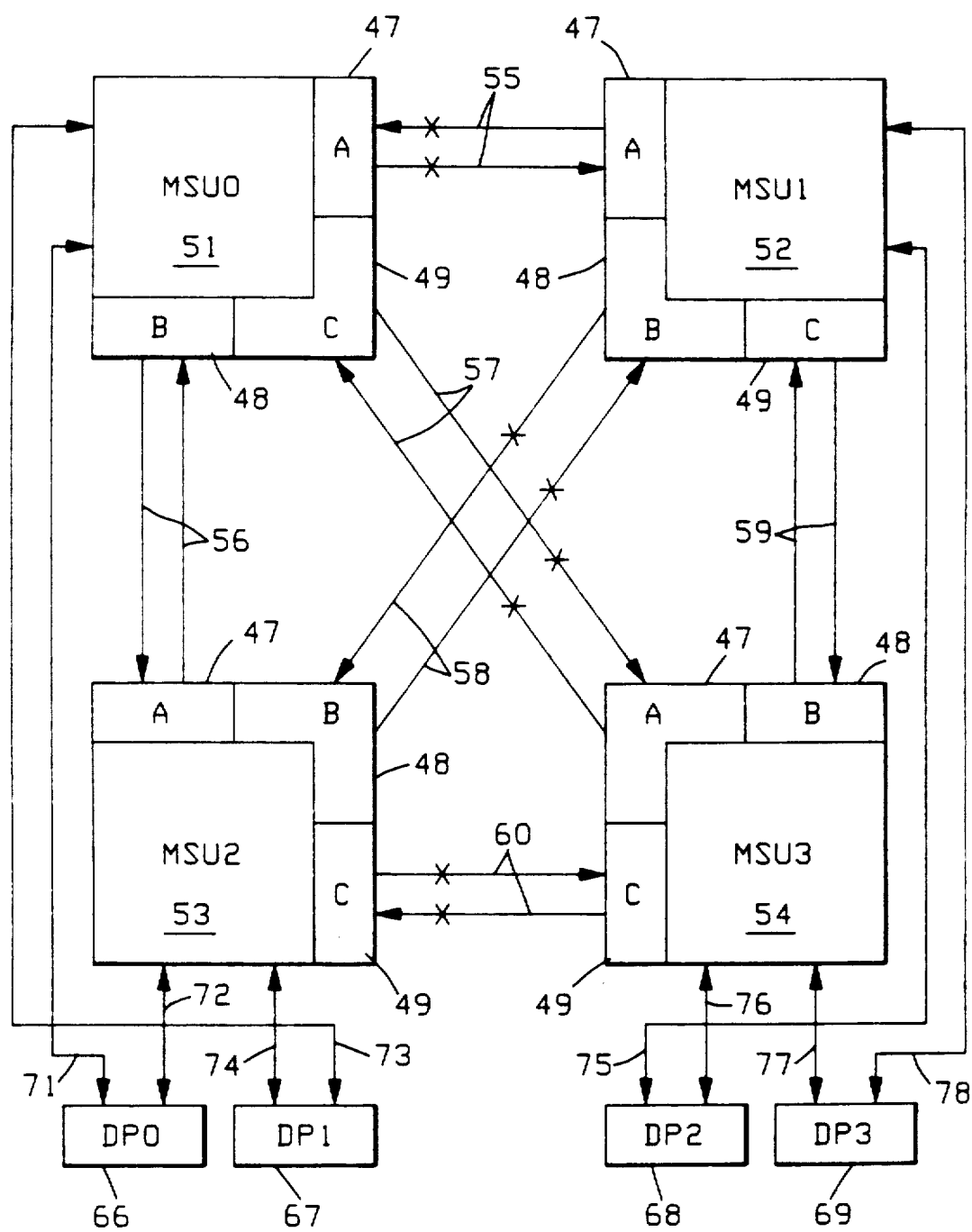
FIG. 5 is a schematic block diagram showing the four MSUs of FIG. 3 connected operably in pairs to two pairs of data processors.

Refer now to FIG. 5 showing a schematic block diagram of the same four data processors 66-69 now connected to the same four MSUs 51-54 in two, two-by-two configurations. In this regard, the data processor 66 is shown connected to MSUs 51 and 53 via busses 71 and 72 and data processor 67 is connected to the same two MSUs 51 and 53 by busses 73 and 74. Similarly, the two data processors 68 and 69 are each connected to the MSUs 52 and 54 by their pairs of busses 75, 76 and 77, 78, respectively. As explained hereinbefore, the pairs of cables 55-60 must be connected or not connected (disconnected) at the interfaces to provide the proper operation for this configuration. In this regards the pairs of cables 55, 57, 58 and 60 are shown disconnected from, or not connected, to their respective interfaces.

Figure 6:
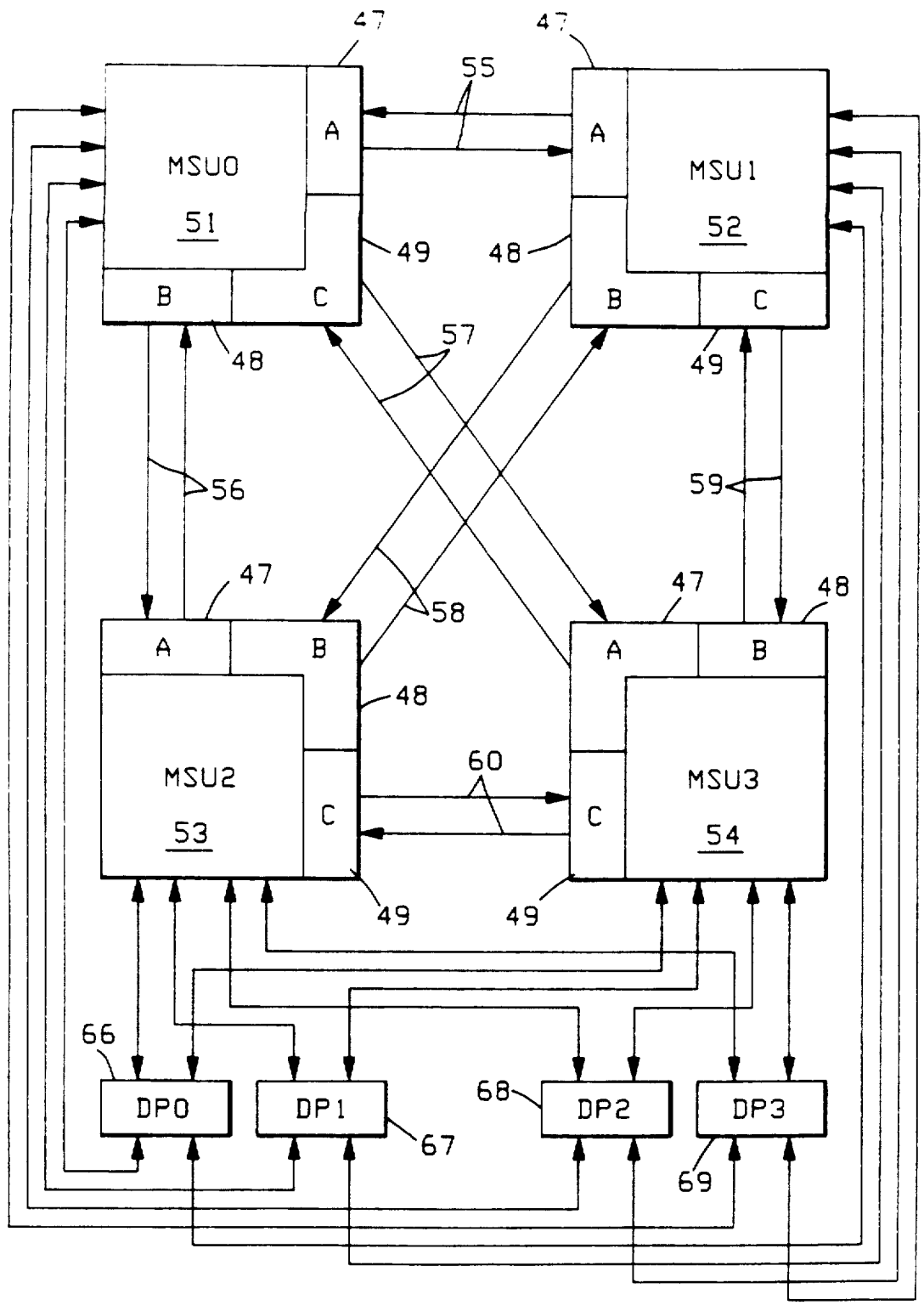
FIG. 6 is a schematic block diagram showing the four MSUs of FIG. 3 connected operably to each of four data processors.

Refer now to FIG. 6 showing a schematic block diagram of the same four MSUs as FIG. 3 connected operably to the same four data processors 66-69 as shown in FIGS. 4 and 5. In this maximum configuration characterized as a four-by-four configuration, all of the pairs of interconnecting cables 55-60 are interconnected to their respective interfaces and each of the data processors 66-69 has a bus which is operably connected to each of the MSUs 51-54 as shown. The system shown in FIG. 6, as in previous Figures, involves a plurality of MSUs interconnected and accessible by more than one data processor. In a system of this type, only one day clock of the four day clocks in the four MSUs is employed to synchronize the total system as was known previously in the prior art computing systems designed by Unisys Corporation. In contrast thereto, the four systems shown in FIG. 4 each employ the day clock of their respective MSUs. Similarly, in FIG. 5, there are two systems and only one of the day clocks from the two MSUs in each of the two systems will be operable. Similarly, out of the four available day clocks in FIG. 3, only one of the day clocks in one MSU is operable to synchronize the system.

Figure 7:
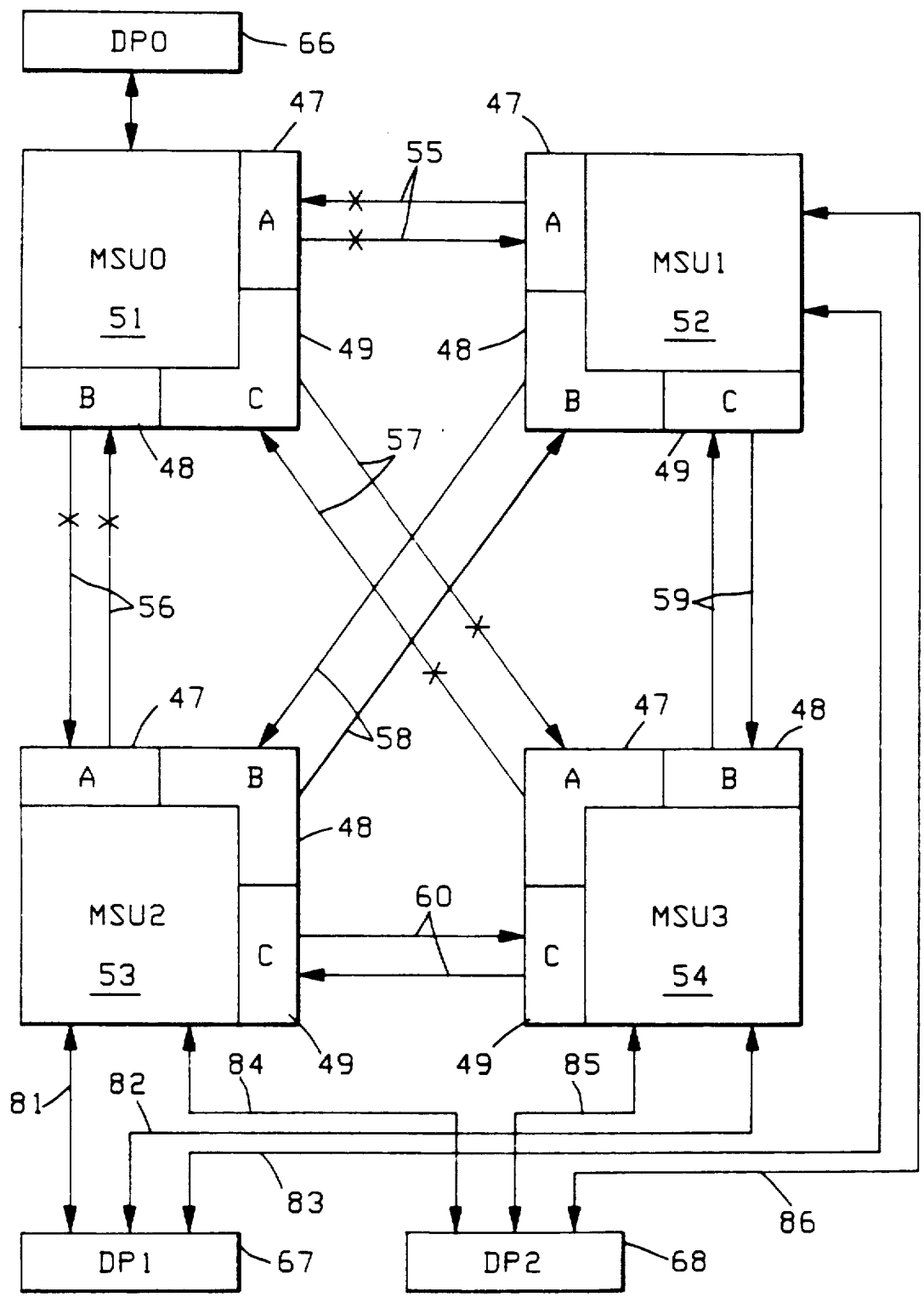
FIG. 7 is a schematic block diagram showing the four MSUs of FIG. 3 connected operably to three data processors in a one-by-one and two-by-three configuration.

Refer now to FIG. 7 showing the four MSUs 51-54 connected operably to three data processors 66-68. The processors are connected in a one-by-one and in a two-by-three configuration. In this configuration, DPO or data processors 66 is connected to MSU 51 to form an isolated system and data processors 67 and 68 are each connected to MSUs 53, 54 and 52 by their respective busses 81, 82, 83 and 84, 85, 86.

Having explained the different combinations associated with FIGS. 3-7, it will be understood that the maximum system permits up to four instruction processors and four I/O processors in different configures. Four separate data processors to be connected through the three port cards, each of which has three ports. Each of the four MSUs has associated memory array cards 15 and 16. Before the interface connections can be made and properly connected at the MSUs, it is necessary to know which data processors will be associated with the respective MSUs. Once this information is available, the information can be entered into a system support processor to program the MSU interface connections as well as the port cards, the IPs, the IOPs, and logic circuitry on the support control card 17.

To better illustrate the manner in which the MSUs are programmed, refer to FIG. 8 showing a schematic block diagram of a system support processor 87 having a multiplexer 88 for isolating one of the four cables 89-92 which connect to the unit support controllers 93-96. The unit support controllers contain microprocessors and hardware logic which enables the system support processor 87 to effectively program the individual support control cards 17. The support cards 17 are each provided with interfaces A, B and C for interconnecting the respective MSUs 51-54 as shown in FIGS. 3 to 7. The unit support controllers 93-96 are connected to the support control cards 17 by their respective bidirectional busses 97-100. In the preferred embodiment, upon initialization, the SSP 87 is sequentially matched to a system support card 17 causing the interface latches and switches at the selected MSU to be properly programmed during initiation of the computer system. After all of the MSUs are properly initiated for operation in the system, the SSP 87 is then able to issue a command to one of the MSUs to begin operation by initiating the initial program load process. Each individual subsystem may be brought on line one after the other.

Having explained a preferred embodiment multiprocessor system embodying a plurality of programmable interconnectable MSUs, it will be appreciated that the hardware and software required for interconnecting four MSUs is greatly reduced by reducing the number of interfaces 47-49 at the MSU from four to three. By reducing the software and hardware, not only is cost of the MSU reduced but reliability of the system is enhanced. Further, it will be appreciated by the explanation of the preferred embodiment employing only four MSUs with three interfaces, that a configuration of a greater number of MSUs will require one interface less than the number of MSUs in the combined configuration when more or less MSUs than the four illustrated in the preferred embodiment are employed.

What is claimed is:

1. A system for interconnecting four main storage units (MSUs) to form a multiprocessor computer system of the type having a plurality of data processors, comprising:
    four MSUs each having only three interfaces,
    each of the three interfaces of a MSU being connected to each one to the other three MSUs in the system,
    six total pairs of two input-output cables forming permanent connections from each of said three interfaces of said four MSUs to each of the other MSUs, and
    three of said six total pairs of said input-output cables being physically connected from an MSU to one of the interfaces of the other three MSUs, and
    each of the remaining three pairs of input-output cables being physically connected from one of the interfaces of the other three MSUs to one of the other two MSUs.

2. A system as set forth in claim 1 which further includes system support processor means for programmably interconnecting each of said three interfaces of said four MSUs to operably interconnect any one of said MSUs with the other MSUs.

3. A system as set forth in claim 1 wherein said system processor means is programmable to operably disconnect one or more of said pairs of input-output cables physically interconnecting said MSUs.

4. A system as set forth in claim 1 wherein said four MSUs are operably connected for use by one data processor.

5. A system as set forth in claim 1 wherein said four MSUs are operably interconnected for use by up to four data processors, each data processing comprising at least one instruction processor and an associated I/O processor.

6. A system as set forth in claim 1 wherein two of said MSUs are operably interconnected for use by one data processor and the other two MSUs are operably interconnected for use by two other data processors.

7. A system as set forth in claim 1 wherein one of said MSUs are operably interconnected for use by one data processor and the other three MSUs are operably interconnected for use by a plurality of data processors.

8. A system for interconnecting a plurality X of main storage units (MSUs) greater than two to form a multiprocessor computer system of the type having a plurality of data processors, comprising:
    X number of MSUs, each having only X−1 number of interfaces for being connected to each one the other MSUs in the system,
    X(X−1)/2 total numbers of pairs of input-output cables forming permanent connections from the X−1 number of interfaces of said X number of MSUs to each of the other MSUs.
    X−1 number of said X(X−1)/2 total number of pairs of said input-output cables being physically connected from one MSU to one of the interfaces of each of the other MSUs, and
    each of said remaining number of pairs of input-output cables being physically connected from one of the interfaces of the other MSUs to one of the MSUs.

9. A system for interconnecting a plurality of main storage units as set forth in claim 8 wherein the number X is an integer from the value 3 to 8.

10. A system as set forth in claim 2 wherein said system support processor means comprises a system support processor coupled to one of a plurality of unit support controllers through a multiplexer for programming individual support controllers through a multiplexer for programming individual support control cards in each of said MSUs, and each of said support control cards in each said MSU being coupled to said three interfaces of said MSUs for connecting a disconnecting said pairs of input-output cables between different MSUs.

* * * * *

UNITED STATES PATENT AND TRADEMARK OFFICE
CERTIFICATE OF CORRECTION

PATENT NO. : 5,142,629

DATED : August 25, 1992

INVENTOR(S) : Larry L. Byers, Joseba M. Desubijana

It is certified that error appears in the above-identified patent and that said Letters Patent is hereby corrected as shown below:

Column 6 line 44, insert -- remaining -- before "MSU's"

Signed and Sealed this

Seventh Day of September, 1993

Attest:

BRUCE LEHMAN

Attesting Officer

Commissioner of Patents and Trademarks